A. K. LEE.
Filters for Cane-Juice, Oils, and other Dense Liquids.

No. 137,849. Patented April 15, 1873.

Witnesses:
Edwin James.
K. V. Gordon.

Inventor:
Archibald K. Lee.
per J. E. H. Holmead
Attorney.

UNITED STATES PATENT OFFICE.

ARCHIBALD K. LEE, OF GALVESTON, TEXAS.

IMPROVEMENT IN FILTERS FOR CANE-JUICE, OILS, AND OTHER DENSE LIQUIDS.

Specification forming part of Letters Patent No. 137,849, dated April 15, 1873; application filed April 5, 1873.

*To all whom it may concern:*

Be it known that I, ARCHIBALD K. LEE, of the city and county of Galveston and State of Texas, have invented certain new and useful Improvements in Liquid-Strainers, of which the following is a full, clear, and exact description, reference being had to the accompanying drawing and to the letters of reference marked thereon making part of this specification, in which—

Figure 1:
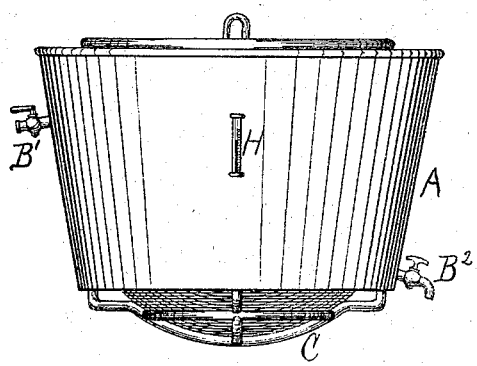
Figure 2:
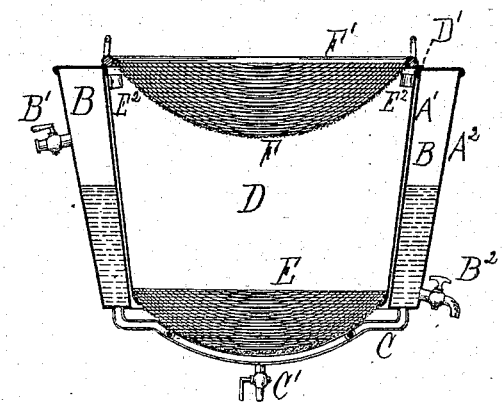
Figure 3:
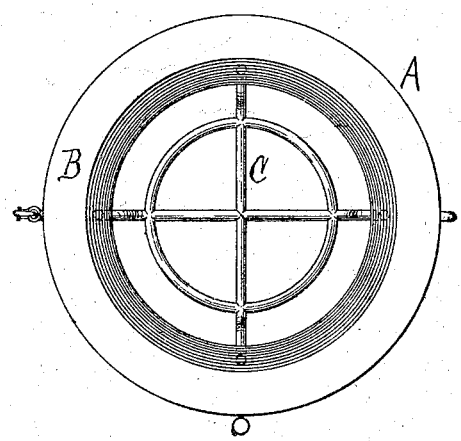

Figure 1 is a side view. Fig. 2 is a vertical sectional view. Fig. 3 is a top view, the strainers or filtering-kettles being removed.

The object of my invention is to provide an improved device to be used for straining cane-juice, soap, resin, varnish, oils, and all other thick and heavy liquids, which it is desirable to run off at a uniform or any given temperature. The nature of my invention consists in surrounding the wall of the vessel which receives the straining-kettle with a jacket in such manner as to leave a close and tight steam-chamber, and in connecting with said chamber steam-pipes so arranged that their heat shall act directly on the lower strainer, and consequently directly on that portion of the liquid which it is desirable next to run through. My improvement also consists in so constructing the strainer-kettle as to permit of its being removed at pleasure, which allows of a series of kettles being used in connection with a single straining-vessel, and which is a great advantage not only for the purpose of cleaning the strainers, but it also permits cups the straining meshes of which are formed of different-size wires being used in connection with the same vessel. My improvement also consists in providing the vessel with two strainers—a coarse one, which first receives the liquid, and a finer one, which acts immediately in connection with the steam-pipe.

The construction and operation of my invention are as follows:

A is an open vessel, constructed of boiler-iron or any other suitable metal, and consists of an inner wall, $A^1$, and a jacket or outer wall, $A^2$, which are relatively so arranged and connected as to form a close annular steam-chamber, B. Steam is supplied to this chamber by means of the nozzle $B^1$, and, when condensed, drawn off by means of the cock $B^2$. C C are steam-pipes which enter the chamber B at its lower section, and are slightly curved or bent so as to, as nearly as possible, conform to the contour of the straining-surface in connection with which they are designed to act. These pipes C C, as shown in the drawing, run in opposite directions and cross each other and meet at a center; but I desire it distinctly understood that there is nothing arbitrary as to the number of pipes used, or their precise arrangement, as the number may be increased or diminished at pleasure, and their connections and arrangement changed as occasion may require, and this, too, without in the slightest degree altering their function, which is to supply to the thick and heavy liquid an additional heat at the instant of its being brought in contact with the finer meshes of the lower strainer, and which causes it the more readily to filter or run therethrough. $C'$ is a cock by which the condensed steam and sediment are drawn off from the pipes C C. D is the straining or filtering kettle, and is of such form and dimensions as to fit snugly within the vessel A, as clearly shown in Fig. 2, which causes it to be entirely encircled with the heat from the steam-chamber, as its wire-mesh E is by that from the pipes C C. This kettle D is constructed of copper or other non-corrosive material, and has an annular rim-flange, $D'$, by means of which it is supported on the upper edge of the walls of the vessel A. E is a wire-gauze strainer, which is concave in form, and is secured around the open bottom of the kettle D. When in position in the vessel A this strainer E rests immediately above the pipes C C, as clearly shown in Figs. 1 and 2. F is another concave wire-strainer, the meshes or openings of which are larger than are those of the strainer E, and is secured in an open ring-plate or disk-shaped rim, $F'$, which rests when in position on the flange $D'$ of the kettle. $E^2$ $E^2$ are eyes within the kettle, by means of which, with a bail or any other suitable means, the kettle can be removed, and which is a great advantage, especially as in connection with a single vessel, A, I contemplate using a series of these kettles, whose strainers, if desired, may be constructed of gauze the size of whose meshes differ, which permits the same vessel being used in connection with kettles arranged to strain liquids of varying degrees of density. H is a thermometer, and is designed simply to indicate the degree of heat, so that the operator may the more readily work the apparatus under a fixed or uniform temperature.

From the foregoing description the operation of my apparatus will readily be understood. Steam is admitted by the nozzle B', and, the chamber B being fully or partially filled, the steam passes on, filling the pipes C C. The kettle D and strainer F are now placed in position, the thermometer H always indicating the degree of temperature. The liquid is supplied to the strainer F, the meshes of which being coarse, only the heavier or grosser impurities are separated. From this strainer F the now partially-filtered liquid passes to the kettle D, which is encircled with heat sent forth from the chamber B, and which of course has a tendency to render the liquid less heavy, and which continues until the liquid reaches the strainer E, where, the heat emitted from the pipes C C acting on it directly as it reaches said strainer, a still higher degree of liquidization is insured, which causes much of the liquid readily to run through which without the aid of the pipes C C would remain in the kettle. Especially would this be the case with heavy liquids, and a strainer having meshes as fine and close as I propose to employ in the manufacture of the strainer E.

Owing to the fact that the kettle D and strainers E and F are entirely independent of the vessel A, and in view of the fact that I propose using a series of these kettles and strainers, when one set becomes unclean or choked, you can readily remove them and replace them with a clean and fresh set, which will cause only a moment or two's interruption to the operation of the apparatus.

What I claim as new, and desire to secure by Letters Patent of the United States, is—

1. The steam-pipes C C, arranged in connection with a strainer or filtering surface, as to operate substantially as described.

2. The vessel A, having a steam-chamber, B, formed as shown, and the pipes C C, the whole being combined and arranged to operate substantially as described.

3. In combination with the vessel A, the independent kettle D, having at its lower section a straining or filtering surface, E, the whole being constructed and arranged as to permit of the kettle being removed at pleasure, whereby a series of kettles can be used in connection with the same vessel, as and for the purpose specified.

4. The vessel A, kettle D, strainer E, having close meshes or small openings, and the coarse strainer F, the whole being so combined and arranged as to operate substantially as described.

In testimony whereof I have signed my name to this specification in the presence of two subscribing witnesses.

ARCHIBALD K. LEE.

Witnesses:
EDWIN JAMES,
JOS. T. K. PLANT.